L. D. VERMILYA, W. S. REYBURN & E. A. W. HUNTER

L. D. VERMILYA, Assignor to W. S. REYBURN, E. A. W. HUNTER & B. P. MOULTON.

Lightning-Rod.

No. 8,429. Reissued Sept. 24, 1878.

INVENTORS

W. S. Reyburn, E. A. W. Hunter &

B. P. Moulton Assignee of

L. D. Vermilya & W. S. Reyburn & E. A. W. Hunter

By Coburn & Thacher

Attorneys

Witnesses

W. C. Corlies

L. A. Bunting

THE NORRIS PETERS CO., PHOTO-LITHO., WASHINGTON, D. C.

UNITED STATES PATENT OFFICE.

LELAND D. VERMILYA, OF DAYTON, OHIO, AND WILLIAM S. REYBURN AND EDMOND A. W. HUNTER, OF PHILADELPHIA; SAID VERMILYA ASSIGNOR, BY MESNE ASSIGNMENTS, TO SAID REYBURN AND HUNTER AND BYRON P. MOULTON, OF PHILADELPHIA, PENNSYLVANIA.

IMPROVEMENT IN LIGHTNING-RODS.

Specification forming part of Letters Patent No. 92,551, dated July 13, 1869; Reissue No. 8,429, dated September 24, 1878; application filed August 3, 1878.

*To all whom it may concern:*

Be it known that LELAND D. VERMILYA, of Dayton, in the county of Montgomery and State of Ohio, and WILLIAM S. REYBURN and EDMOND A. W. HUNTER, of Philadelphia, in the county of Philadelphia and State of Pennsylvania, have invented a new and useful Improvement in Lightning-Rods, which is fully described in the following specification, reference being had to the accompanying drawings, in which—

Figure 1:
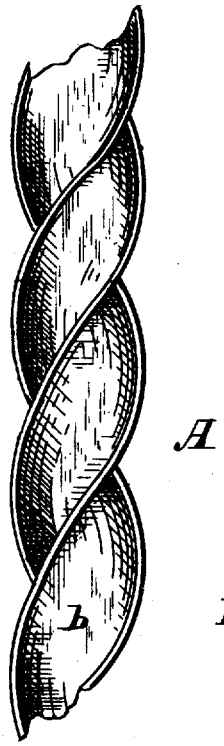
Figure 2:
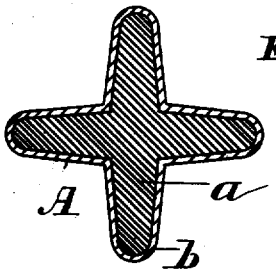

Figure 1 represents a side view of a section of rod constructed according to our invention, and Fig. 2 an end view, showing the shape of the rod in cross-section.

Our invention relates to the construction of lightning-rods upon the exterior of which are ribs or flanges.

The invention consists in a rod composed of a core of iron, of suitable form, and a strip or sheet of copper applied to the core so as to form an outer covering or casing, which fits closely the opposite edges or ribs of the core.

It also consists in the combination of a core of iron and a covering of sheet-copper the surface of which is flanged or angular.

It also consists in the special manner of combining the core and copper casing, all of which will be hereinafter more fully set forth.

In the drawings, A represents a section of lightning-rod, which is composed of a core, *a*, of angle-iron, and an outer covering or casing, *b*, of sheet-copper, which is wrapped around the core so as to completely cover it and expose upon the surface only the sheet-copper.

The iron core is, in the example, in the form of a cross-section, there being four wings or angles of sufficient weight to give the required strength to the rod when the latter is twisted or given a spiral form, as shown in the drawing. This is undoubtedly the best form that a given weight of iron can be put into for a lightning-rod, as its self-supporting power and conductibility cannot be excelled; but our invention is not limited to this particular form, as the wings may be more or less in number, as may be desired.

To increase the conductive power of the rod we cover the iron core with a sheathing, *b*, of sheet-copper. This sheathing is applied when the rod is twisted, the sheet of copper being put on and the rod twisted at one and the same operation, though the precise manner of applying the covering does not constitute any portion of the invention herein claimed.

The edges of the copper ribbon are lapped over each other and pressed down, so as to make a water-tight joint, which will effectually exclude water and prevent oxidation. The copper sheet is firmly pressed to the surface and into the angles of the iron, and the rod in this spiral form is equal in its conductive power to a round copper rod of the same diameter, while the stiffness and strength of the iron are secured by the combination of two metals in this form. This combined spiral rod (which is equal, as to its conductive power, to a solid copper rod presenting the same superficial area, and superior as regards its strength and self-supporting power) can be manufactured for one-third the cost of the solid copper rod above named. We are thus enabled to furnish to the public a lightning-rod quite equal if not superior to any rod in use, at a greatly-reduced expense.

Having thus described our invention, what we claim as new, and desire to secure by Letters Patent, is—

1. A lightning-rod composed of an iron core having tapering edges or flanges and a sheathing of sheet-copper, which surrounds the core and is fitted to the edges or flanges thereof, substantially as described.

2. In a lightning-rod, the combination of an iron core and a covering or casing of sheet-copper bent to form a series of exterior ribs or flanges, substantially as described.

3. In a lightning-rod, the core *a* of angle-iron, in combination with the copper sheathing *b*, closely fitted to the surface of the core, and closed at its contiguous edges by a tight joint, substantially as described.

WILLIAM S. REYBURN.
EDMOND A. W. HUNTER.
BYRON P. MOULTON.

Witnesses:
JNO. TAYLOR,
ALFRED H. BRIDGE.